US005778075A

United States Patent [19]

Haartsen

[11] Patent Number: 5,778,075
[45] Date of Patent: Jul. 7, 1998

[54] METHODS AND SYSTEMS FOR MOBILE TERMINAL ASSISTED HANDOVER IN AN PRIVATE RADIO COMMUNICATIONS NETWORK

[75] Inventor: Jacobus Cornelis Haartsen, Staffanstorp, Sweden

[73] Assignee: Telefonaktiebolaget, L.M. Ericsson, Sweden

[21] Appl. No.: 705,724

[22] Filed: Aug. 30, 1996

[51] Int. Cl.$^6$ .................................................. H04L 9/00
[52] U.S. Cl. ............................. 380/49; 380/9; 380/48; 380/59; 375/200; 375/203; 455/422; 455/436
[58] Field of Search ............................. 380/9, 34, 48, 380/49, 50, 59; 375/200, 201, 202, 203, 204, 206, 207, 208, 209, 210; 455/422, 436

[56] References Cited

U.S. PATENT DOCUMENTS

| 5,081,679 | 1/1992 | Dent ............................................. 380/48 |
| 5,109,528 | 4/1992 | Uddenfeldt . | |
| 5,243,653 | 9/1993 | Malek et al. ............................... 380/48 |
| 5,293,423 | 3/1994 | Dahlin et al. .............................. 380/48 |
| 5,428,668 | 6/1995 | Dent et al. . | |
| 5,517,675 | 5/1996 | O'Connor et al. . | |
| 5,546,464 | 8/1996 | Raith et al. ................................ 380/48 |

FOREIGN PATENT DOCUMENTS 0 568 212 A2  11/1993  European Pat. Off. .

OTHER PUBLICATIONS

*Encryption,* Mobility and Security Management, pp. 480–484, 1993.
*Handover Execution,* Radio and Resource Mnagement, pp. 396–412, 1993.

Primary Examiner—Bernarr E. Gregory
Attorney, Agent, or Firm—Myers Bigel Sibley & Sajovec, P.A.

[57] ABSTRACT

Mobile assisted handover of an encrypted traffic connection between linked base stations of a private radio communications network are provided in a system including a plurality of base stations and a mobile terminal. The mobile terminal detects a signal quality of a received beacon transmission from a private base station of the private radio communications network while an encrypted traffic connection is underway with another base station of the private radio communications network. The beacon transmissions are received and a signal quality detected during idle frames of the ongoing traffic connection. The mobile terminal may also detect signal quality of the ongoing traffic connection and transmit it to the base station. The detected signal quality and identification of the beacon transmitting private base station are provided to the private radio communications network which determines whether a handover should be initiated. Depending upon which of the forwarding or receiving base stations current TDMA frame number will be used for encryption of a handed over encrypted traffic connection, a reference TDMA frame number is exchanged between the forwarding and receiving base station. If the receiving base station TDMA reference number is to be used, it is forwarded to the mobile terminal on a control channel of the ongoing encrypted traffic connection from the forwarding base station. The transfer takes place within a single multiframe of the TDMA protocol of the private radio communications network and, after correction for any delays in transfer of the TDMA reference number, handover takes place in the following multiframe.

18 Claims, 10 Drawing Sheets

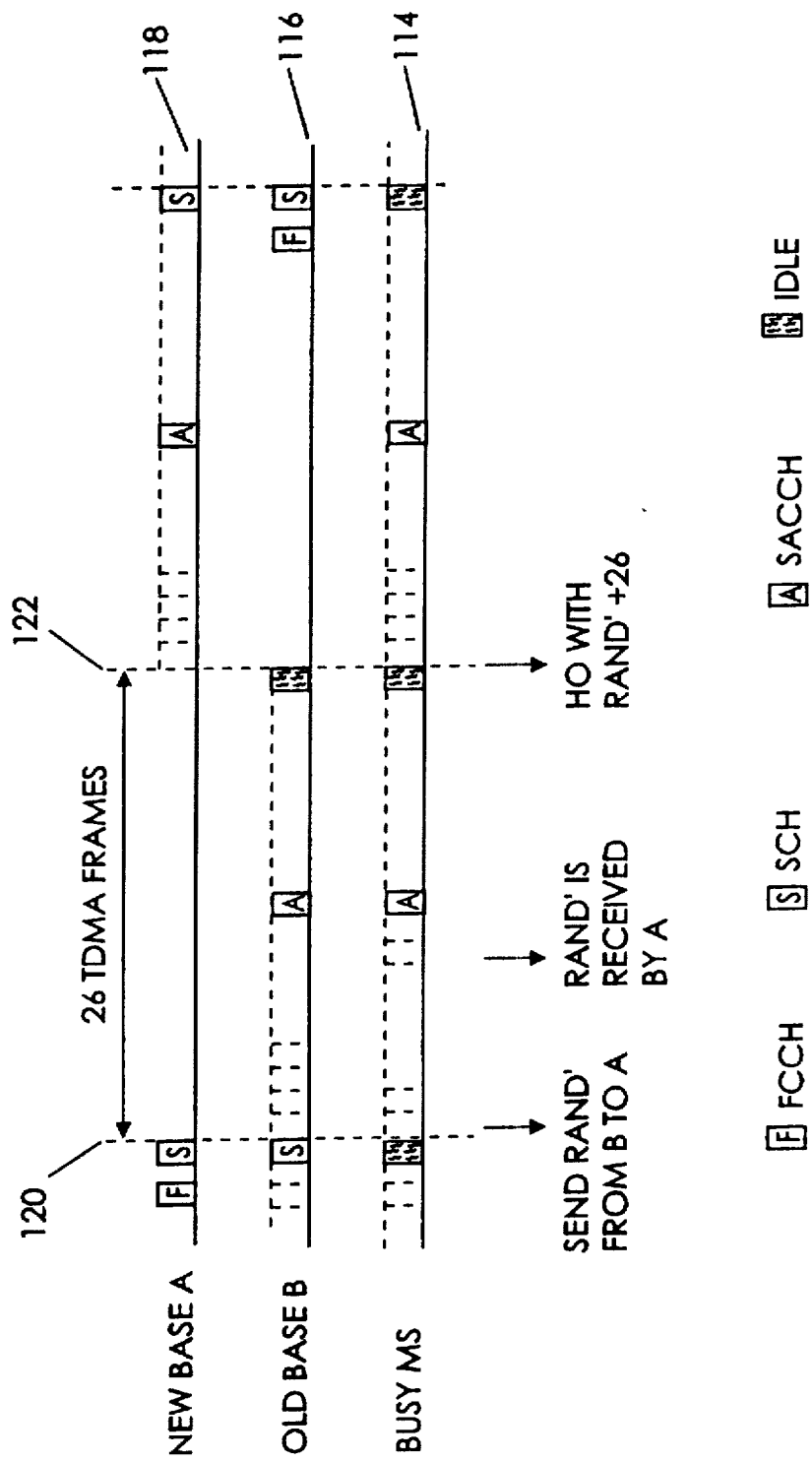

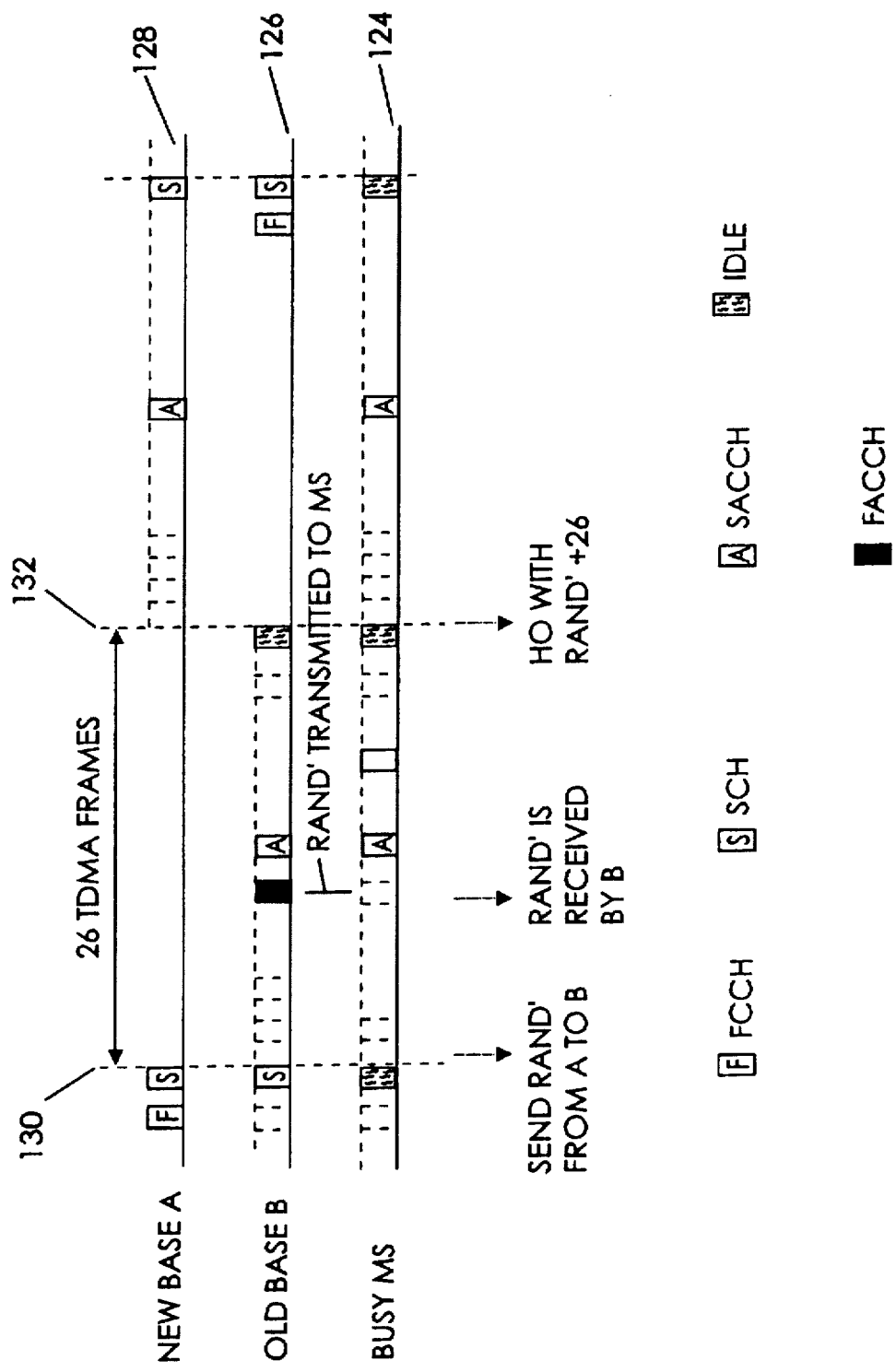

METHODS AND SYSTEMS FOR MOBILE TERMINAL ASSISTED HANDOVER IN AN PRIVATE RADIO COMMUNICATIONS NETWORK

FIELD OF THE INVENTION

This invention relates to communication systems and more particularly to private radio communication networks having a plurality of base stations.

BACKGROUND OF THE INVENTION

Public cellular networks (public land mobile networks) are commonly employed to provide voice and data communications to a plurality of subscribers. For example, analog cellular radiotelephone systems, such as designated AMPS, ETACS, NMT-450, and NMT-900, have been deployed successfully throughout the world. More recently, digital cellular radiotelephone systems such as designated IS-54B in North America and the pan-European GSM system have been introduced. These systems, and others, are described, for example, in the book titled *Cellular Radio Systems* by Balston, et al., published by Artech House, Norwood, Mass., 1993.

Traditional analog radiotelephone systems generally employ a system referred to as frequency division multiple access (FDMA) to create communications channels. As a practical matter well-known to those skilled in the art, radiotelephone communications signals, being modulated waveforms, typically are communicated over predetermined frequency bands in a spectrum of carrier frequencies. These discrete frequency bands serve as channels over which cellular radiotelephones communicate with a cell, through the base station or satellite serving the cell. In the United States, for example, Federal authorities have allocated to cellular communications a block of the UHF frequency spectrum further subdivided into pairs of narrow frequency bands, a system designated EIA-553 or IS-19B. Channel pairing results from the frequency duplex arrangement wherein the transmit and receive frequencies in each pair are offset by 45 Mhz. At present there are 832, 30-Khz wide, radio channels allocated to cellular mobile communications in the United States.

The limitations on the number of available frequency bands present several challenges as the number of subscribers increases. Increasing the number of subscribers in a cellular radiotelephone system generally requires more efficient utilization of the limited available frequency spectrum in order to provide more total channels while maintaining communications quality. This challenge is heightened because subscribers may not be uniformly distributed among cells in the system. More channels may be needed for particular cells to handle potentially higher local subscriber densities at any given time. For example, a cell in an urban area might conceivably contain hundreds or thousands of subscribers at any one time, easily exhausting the number of frequency bands available in the cell.

For these reasons, conventional cellular systems employ frequency reuse to increase potential channel capacity in each cell and increase spectral efficiency. Frequency reuse involves allocating frequency bands to each cell, with cells employing the same frequencies geographically separated to allow radiotelephones in different cells to simultaneously use the same frequency without interfering with each other. By so doing, many thousands of subscribers may be served by a system of only several hundred frequency bands.

Another technique which may further increase channel capacity and spectral efficiency is time division multiple access (TDMA). A TDMA system may be implemented by subdividing the frequency bands employed in conventional FDMA systems into sequential time slots. Although communication on frequency bands typically occur on a common TDMA frame that includes a plurality of time slots, communications on each frequency band may occur according to a unique TDMA frame, with time slots unique to that band. Examples of systems employing TDMA are the dual analog/digital IS-54B standard employed in the United States, in which each of the original frequency bands of EIA-553 is subdivided into 3 time slots, and the European GSM standard, which divides each of its frequency bands into 8 time slots (or burst periods) which define a frame. In these TDMA systems, each user communicates with the base station using bursts of digital data transmitted during the user's assigned time slots.

A channel in a TDMA system typically includes one or more time slots on one or more frequency bands. As discussed above, traffic channels are used to communicate voice, data or other information between users, for example, between a mobile terminal such as a radiotelephone and a landline telephone. In this manner, each traffic channel forms one direction of the duplex communications link established by the system from one user to another. Traffic channels typically are dynamically assigned by the system when and where needed. In addition, systems such as the European GSM system, may "frequency hop" traffic channels, i.e., randomly switch the frequency band on which a particular traffic channel is transmitted. Frequency hopping reduces the probability of interference events between channels, using interferer diversity and averaging to increase overall communications quality.

Typically included in the dedicated control channels transmitted in a cell are forward control channels which are used to broadcast control information in a cell of the wide area cellular network to radiotelephones which may seek to access the network. The control information broadcast on a forward control channel may include such things as the cell's identification, an associated network identification, system timing information and other information needed to access the wide area cellular network from a radiotelephone.

Forward control channels, such as the Broadcast Control Channel (BCCH) of the GSM standard, typically are transmitted on a dedicated frequency band in each cell. A radiotelephone seeking access to a system generally "listens" to a control channel in standby mode, and is unsynchronized to a base station or satellite until it captures a base station or satellite control channel. In order to prevent undue interference between control channels in neighboring cells, frequency reuse is conventionally employed, with different dedicated frequency bands being used for the control channel in neighboring cells, according to a frequency reuse pattern that guarantees a minimum separation between cochannel cells. Frequency hopping, which might allow denser reuse of control channel frequency bands, is typically not employed because an unsynchronized radiotelephone generally would have difficulty capturing a frequency-hopped control channel due to lack of a reference point for the frequency hopping sequence employed. Moreover, for private uncoordinated radio communications systems, a frequency reuse pattern cannot be used because each private radio communications system typically operates independently of other potentially interfering systems including the wide area cellular network.

The past decades have shown a considerable rise in the deployment of mobile telephony. With a slow start of the analog standards like AMPS, NMT and TACS, mobile telephony has really hit the consumer markets with the advanced digital standards incorporating TDMA like GSM and D-AMPS. In addition to progress in mobile terminal features like size and battery life, much progress has been made at the network side as well. Increasingly dense cell reuse plans have been complemented with hierarchical cell structures, where macrocells cover entire districts, microcells cover smaller parts like streets, and picocells cover very small areas the size of a few rooms. Important for the hierarchical cell structure is that each base station deployed (ranging from macro to pico base stations) is part of the same Public Land Mobile Network (PLMN), also referred to as a wide area cellular network. When a mobile user wanders from a macrocell to a microcell area, the call can be handed off from a macro base station to a micro base station without the user noticing it. This is particularly true for digital phone systems that apply TDMA: being handed off from one base station to another within a coordinated wide area cellular network for the mobile phone usually only involves the change of a time slot.

Recently, private radio communications networks for residential and business areas are being developed that use the same air-interface as the public cellular network, but do not form an integrated part with the overlaying public cellular network. In this sense, these private systems are not micro or pico networks since there is no direct connection between these private systems and the public cellular network. For example, for residential usage, private base stations can be used as described in U.S. Pat. No. 5,428,668 which only connect to the PSTN (or ISDN) wire line network. In business or office networks applying a Private Branch Exchange ("PBX"), radio base stations belonging to the same private network may communicate with each other, but generally none of them communicates directly with the overlying wide area cellular network. A mobile terminal in the range of a private radio communications network typically preferably enters a private mode attaching to the private communications network to enjoy benefits such as lower tariffs, longer talk and stand-by time, and better voice quality.

Given the uncoordinated nature of private radio communications systems and the resulting potential for interference not only with the overlaying wide area cellular network but with other private radio communications networks, it is desirable to minimize transmissions, particularly control communications. Unlike the coordinated wide area cellular network, the private networks not only are activated at unpredictable geographic locations relative to each other but may also be periodically relocated if the user moves their office or home. However, as the amount of radio transmission is limited to avoid interference a problem arises with office private radio communications network which include a plurality of private base stations requiring coordination for handover and other private network related functions.

SUMMARY OF THE INVENTION

It is, therefore, an objective of the present invention to resolve the problem of providing handover functions in a private radio communications network using a TDMA protocol such as a GSM-compatible air interface while limiting the amount of control channel traffic to reduce the potential for interference. The present invention provides for a private radio communications network in which all radio base stations of the private network are synchronized up to the multiframe level and transmit a beacon on a beacon channel during the idle frames of a traffic connection. During the idle frames, the mobile terminal performs measurements to find surrounding private base stations within the private radio communications network which might be better candidates to connect to.

If the beacon transmissions from the base stations jitter somewhat within the idle frames the mobile terminal waits on at least one fixed time slot position in the idle frame for a beacon to arrive. In addition, at different occasions, the mobile terminal can scan different frequencies for beacons. Because the private radio base stations are roughly synchronized, the decoding of a beacon burst can be performed by the mobile terminal as long as no collisions occur between beacons. From decoding the beacon, the base color code (BCC) of the base station can be derived by the mobile terminal. Measurements of the received signal strength and the corresponding BCCs can then be transferred from the mobile terminal to the private radio communications network by the connected private radio base station by applying the standard associated control channels (e.g., FACCH or SACCH) defined for the private radio communications network. Based on the mobile terminal reports, the private radio communications network may decide on handing over the mobile terminal to another radio base station within the private radio communications network.

In one embodiment, the private radio communications network of the present invention provides for handover of a TDMA frame number based encryption connection, such as is provided for in GSM, without including a TDMA frame number broadcast by the base station on its beacon channel. For encryption, an initial random number is applied which is synchronously incremented in the base station and the mobile terminal based on the current TDMA frame number of the base station. When the network determines that an ongoing traffic connection is to be handed over, the current random number (or TDMA frame number) used for encryption is transferred from the current radio base station to the new radio base station. This transfer typically may take some undetermined delay time. However, because all the private radio base stations within the private radio communications network are synchronized, it is sufficient to know the random number at the start of the current multiframe. The handover then takes place at the start of the next multiframe, so that the new base station itself may adjust the random number accordingly. When a random number transfer is initiated at the start of a new multiframe, the system delay may vary between zero and N TDMA frames (for example, with N=26 delay up to 120 ms for GSM) without any ambiguity in the encryption parameters. In this embodiment, the handover to the new base station occurs without changing the random number of the mobile terminal.

In another embodiment of the present invention, the random number used at the start of the multiframe in the new base station is instead transferred to the current base station which in turn relays it to the mobile terminal on a fast or slow associated control channel of the ongoing traffic connection. Again, a correction can be carried out to allow for varying delays in transfer of the current TDMA frame (random) number. When the mobile terminal traffic connection occurs at the start of the next multiframe, the mobile terminal uses the (corrected) random number provided by the new base station. In this embodiment, the private base station can use a single random number for all traffic connections underway with the base station which is beneficial when a base station supports several mobile terminals simultaneously. In one aspect of the present invention, a private radio communications network having mobile assisted handover between link base stations is provided, including a first and second base station and a mobile terminal. Each private base station of the private radio communications network includes communication control means for controlling radio communications according to a TDMA protocol of the private radio communications network. Communication control means includes means for defining a traffic channel and a beacon channel corresponding to an idle frame of the traffic channel. The communications control means further includes means for handing over encrypted traffic connections between base stations of the private radio communications network. In addition, the communication control means includes means for synchronizing base stations within the private radio communications network, including synchronizing the traffic channels and beacon channels of each private base station.

Base stations also are provided with encryption means connected to the communications control means of the base station for encrypting a traffic connection using an encryption algorithm dependent on a reference TDMA frame number. Private base stations further include transceiver means operatively connected and responsive to the communications control means for transmitting and receiving an encrypted traffic connection on the base station traffic channel. In addition, the private base station includes means responsive to the communication control means for transmitting radio beacon transmissions free of a TDMA frame number on the beacon channel.

The mobile terminal includes transceiver means for transmitting and receiving an encrypted traffic connection on the traffic channel of the private radio communications network base station. The mobile terminal further includes encryption means connected to the transceiver means of the mobile terminal for encrypting a traffic connection using an encryption algorithm dependent on a reference TDMA frame number. The mobile terminal also includes means for receiving a transmitted radio beacon transmission free of a TDMA frame number on the beacon channel of the private base stations of private radio communications network during an idle frame of a traffic connection with one of the private base stations. The mobile terminal further includes means for detecting a signal quality from a received radio beacon transmission and a means for transmitting the detected signal quality to the base station on which a traffic connection is ongoing. The mobile terminal may further include means for detecting a signal quality from the ongoing traffic connection and for transmitting the detected signal quality of the ongoing traffic connection to the base station. The base station of the private radio communications network includes means for initiating handover of an ongoing encrypted traffic connection responsive to the transmitted detected signal quality from the mobile terminal when the received detected signal quality satisfies a predetermined switching criteria and the means for initiating a handover includes means for exchanging a current reference TDMA frame number with the receiving base station to provide for handover of the encrypted traffic connection. This determination may be based on quality measurements performed by the mobile terminal on a plurality of alternative base stations.

In another aspect of the present invention, the transmitted radio beacon includes a base station identification number which the mobile terminal has means for decoding to determine the associated identification number of the base station and means for transmitting along with the detected signal quality the associated identification of the transmitting base station. The base stations of the private radio communications network of the present invention may also include means for correcting for any transfer delays in exchanging the reference TDMA frame number between the forwarding and receiving base stations based on advance of the private radio communications network into a next multiframe of the TDMA protocol of the private radio communications network.

Also provided are methods for maintaining encryption during handover of an encrypted traffic connection between linked base stations of a private radio communications network. An encrypted traffic connection is established with a first base station of the private radio communications network based on a random encryption number which is updated from an initial assigned value based on the current TDMA frame number of the first base station. The first base station is synchronized to a second base station to which the traffic connection is to be handed over. To prepare for handover, the first base station transfers the current TDMA frame number of the first base station (or if more than one call is underway with different frame numbers the frame number associated with the connection to be forwarded) to the second base station on the link between the base stations of the private radio communications network. Any transfer delays between the first base station and the second base station are then corrected for based on the advance of the private radio communications network into the next consecutive multiframe. Handover is then completed of the encrypted traffic connection from the first base station to the second base station using the corrected current TDMA frame number of the first base station.

In another embodiment of the methods of the present invention, the handover is completed using the TDMA frame number reference of the second or receiving base station rather than the TDMA reference of the first or forwarding base station as described above. In this embodiment, the second base station transfers its current TDMA frame number to the first base station. Any transfer delays between the base stations are corrected for and the corrected TDMA frame number is transmitted to the mobile terminal. Handover is then completed of the encrypted traffic connection from the first base station to the second base station using the corrected current TDMA frame number of the second base station.

Accordingly, the mobile assisted handover methods and systems of the present invention address the problem of providing handover functions in a private radio communications network with a simplified channel architecture which does not include a broadcast TDMA frame reference number. The mobile assisted handover method and systems of the private radio communications network of the present invention are provided by synchronizing the channels of the forwarding and receiving base stations of the private radio communications network and exchanging a current TDMA frame number between the base stations on the private radio communications network link between the base stations in order to facilitate seamless handover. The transfer is preferably accomplished following an idle frame and during a multiframe to provide for seamless handover to the receiving base station in the next multiframe.

BRIEF DESCRIPTION OF THE DRAWINGS

FIG. 13 graphically illustrates handover operations of an encrypted traffic connection between base stations of a private radio communications network according to an embodiment of the present invention; and FIG. 14 graphically illustrates handover operations of an encrypted traffic connection according to a second embodiment of the present invention.

DETAILED DESCRIPTION OF THE INVENTION

Figure 1:
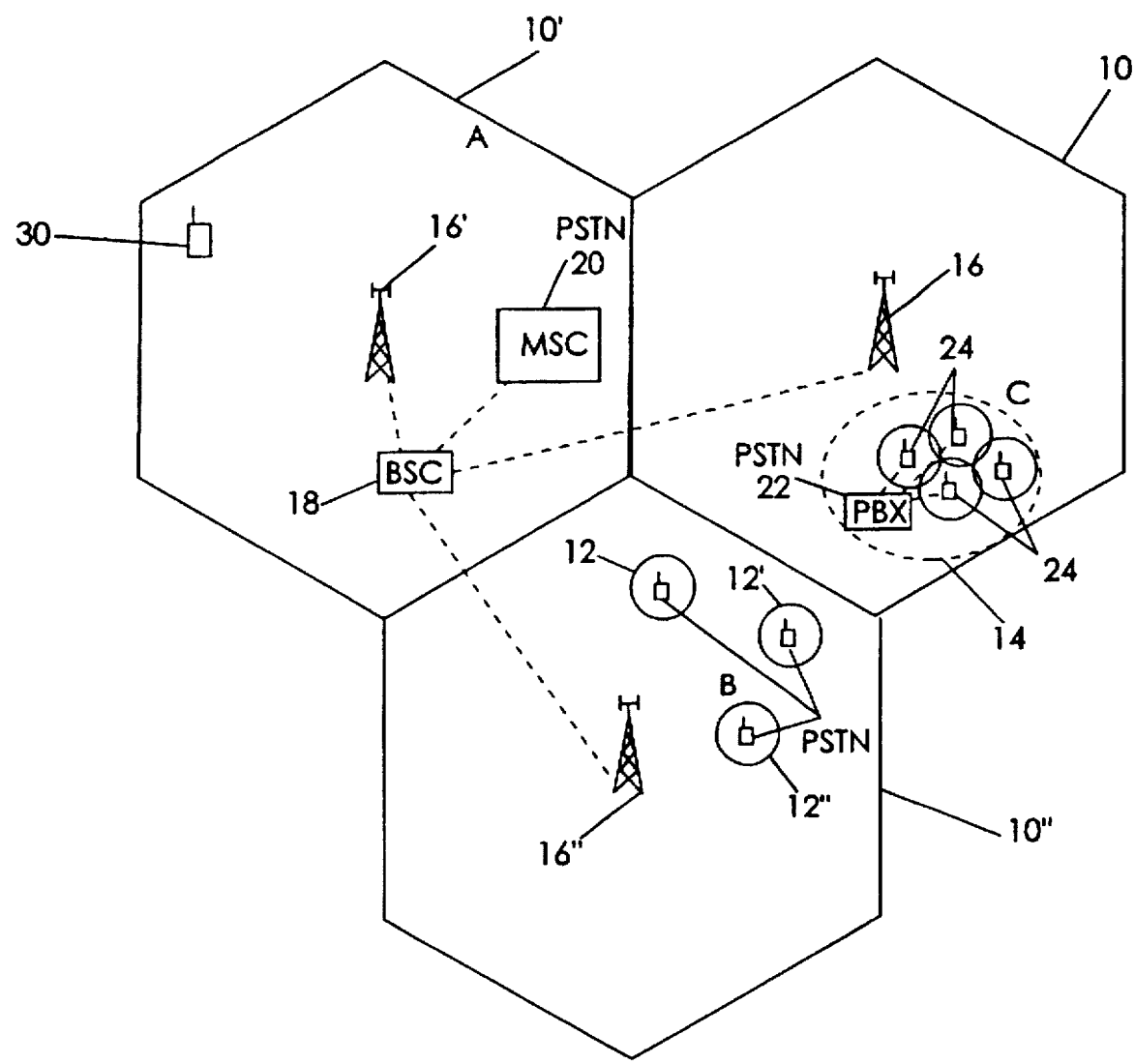
FIG. 1 schematically illustrates a portion of a wide area cellular network including private radio communications networks within the coverage area of the wide area cellular network.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Referring now to FIG. 1, an operating environment of the present invention will be described. The present invention relates to mobile terminals which may operate with private radio communications networks located within hierarchial cell structures of wide area cellular networks such as advanced cellular phone systems, for example, in order to increase capacity in densely populated areas and methods for using the same. Hierarchial cell structures are typically designed around macrocells 10, 10', 10" covering cells with radii which may be in the order of a few kilometers. Macrocells 10, 10', 10" define the cellular structure of the wide area cellular network or PLMN as is well known and will be understood by one of ordinary skill in the art.

Also illustrated in FIG. 1 are office private radio communications network 14 and residential private radio communications network 12, 12', 12". Residential network 12, 12', 12" may include a private base station such as those described in U.S. Pat. No. 5,428,668, which is incorporated herein by reference as if set forth in its entirety. Residential network 12, 12', 12" and office network 14 are private radio communications networks which have wire line connections to the public switched telephone network ("PSTN") via a PSTN switch or exchange 23 (FIG. 2) and/or to an ISDN wire line network. Accordingly, office network 14 and residential network 12, 12', 12" have an associated wire line number by which they communicate over the public switched telephone network (or ISDN).

As illustrated in FIG. 1, the distinction between private radio communications networks 12, 12', 12", and 14 is that office network 14 typically interfaces to the public switched telephone network by a private branch exchange ("PBX") and includes multiple base stations. Office network 14 as illustrated in FIG. 1 is a private radio communications network which connects to the PSTN via private branch exchange ("PBX") 22. Office network 14 further includes base stations 24. Office network 14 and base stations 24 typically are not controlled by the wide area cellular network as they are not a coordinated part of the wide area cellular network.

As illustrated in FIG. 1, macrocells 10, 10', 10" of the wide area cellular network each include at least one base station 16, 16', 16". Base stations 16, 16', 16" are connected via a wired infrastructure as is known to those of ordinary skill in the art. As illustrated in FIG. 1, the wired infrastructure includes base station controller 18 and mobile services switching center 20. The particulars of the infrastructure of the wide area cellular network will not be discussed further herein except to note that the wired infrastructure of the wide area cellular network also includes a connection to the PSTN.

When a mobile terminal user travels in the cellular area of the wide area cellular network, the user's connection is handed off between base station 16, 16', 16" depending upon the mobile-to-base distance and the interference situation. This provides the mobile terminal user a high quality channel even as the user moves from one cell to the other. Methods for controlling interconnected base stations 16, 16', 16" transmission and re-routing of calls from one base station 16, 16', 16" to another in order to maintain a high quality channel (handover) in current wide area cellular networks are described in *The GSM System for Mobile Communication*, published by M. Mouly and M. Pautet (1992).

Mobile terminal 30 operating within the environment illustrated in FIG. 1 may be described as having two operating modes. In the cellular mode, it acts like an ordinary cellular terminal interacting with the wide area cellular network. In the private mode, it acts like a private phone interacting with the base station of private radio communications network 12. However, as described in U.S. Pat. No. 5,428,668, the operations of mobile terminal 30 in the private mode are beneficially carried out at cellular frequencies. Furthermore, in accordance with the present invention, mobile terminal 30 operates using time division multiple access (TDMA) framing structures compatible with those of the wide area cellular network.

Figure 2:
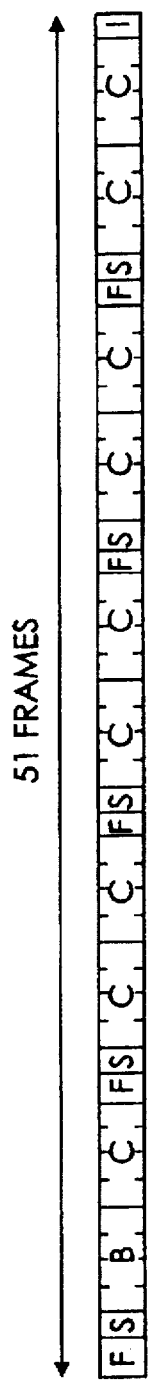
FIG. 2 graphically illustrates a GSM broadcast channel.

Referring now to FIG. 2, the framing of the broadcast channel in GSM is illustrated. As illustrated in FIG. 2, the broadcast channel in GSM is based upon a 51-frame multiframe. The frequency control channel (FCCH) designed F in FIG. 2 is used for frequency synchronization between wide area cellular network base station 16 and mobile terminal 30. The synchronization channel (SCH) designated S in FIG. 2 is used for rough time synchronization between wide area cellular network base station 16 and mobile terminal 30. The common control channels (CCCH) designed C in FIG. 2 are used for paging and access control.

The paging channel (PCH) of the wide area cellular network typically uses four consecutive frames of the CCCH. The position of the PCH is determined by the paging group which is derived from the International Mobile Subscription Identity (IMSI). The period of occurrence of the PCH can be set by the operator of the wide area cellular network at between two and nine 51-frame multiframes. Therefore, in a GSM systems as illustrated, the highest PCH rate is once every two 51-frame multiframes.

Figure 3:
FIG. 3 graphically illustrates a GSM frequency control burst.

Referring now to FIG. 3, the FCCH burst format for GSM is illustrated. The FCCH burst is transmitted in a single TDMA slot. It contains six tail bits and 142 fixed bits which are all zeros. This causes the transmitting modulator to deliver an unmodulated carrier which mobile terminal 30 may then use for frequency synchronization.

Figure 4:
FIG. 4 graphically illustrates a GSM synchronization burst.

Once the FCCH has been found, the SCH can be found quickly and can be decoded for interpretation. The format of the SCH is illustrated in FIG. 4. The 64-bit training sequence is used for timing reference and channel estimates. Six tail bits are used by the convolutional decoder. Finally, there are 78 encoded bits which encode a 25-bit information message. Six of these bits reveal the network identity and base station color code. The remaining 19 bits indicate the TDMA frame number in the frame timing of the transmitting GSM base station.

In contrast to the 51-frame multiframe of the control channel as illustrated in FIG. 2, GSM traffic channels use a 26-frame multiframe structure. Within the traffic channel multiframe, 24 slots are allocated to traffic channels, one slot is dedicated to the slow associated control channel (SACCH) and one slot is an idle slot in which no transmission takes place. The 51/26-frame ratio results in transmissions such as the paging channel on the control channel sliding relative to the traffic channel and causing the idle frame of the traffic channel to slide relative to the control channel. The details of the GSM system are further described in *The GSM System for Mobile Communication*, published by M. Mouly and M. Pautet, ISBN 2-9507190-0-7 (1992).

Figure 5:
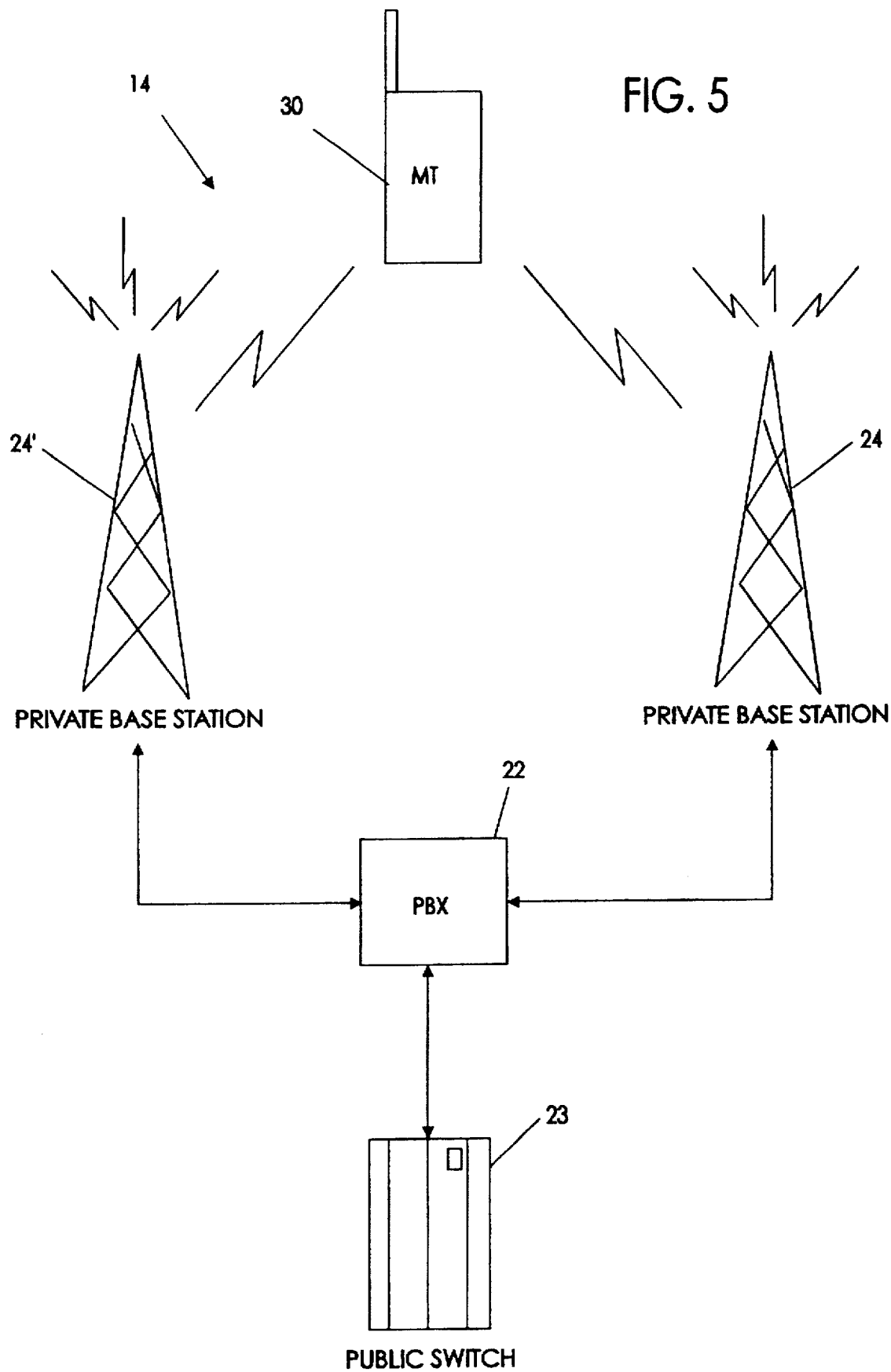
FIG. 5 schematically illustrates a private radio communications network with mobile assisted handover according to the present invention.

Referring now to FIG. 5, a private radio communications network according to the present invention is illustrated. Private office radio communications network 14 includes private base stations 24, 24'. Mobile terminal 30 may access private radio communications network 14 through either base station 24 or 24' depending upon where it is physically located relative to base stations 24, 24'. PBX 22 provides a link between base stations 24, 24' and between the base stations and the PSTN (or ISDN) network through switch 23. PBX 22 further includes base station controller functions including those associated with switching criteria and handover commands. As will be described further herein, private radio communications network 14, including PBX 22 and private base stations 24, 24', includes means for handing over traffic connections in progress between mobile terminal 30 and private base stations 24, 24' based on received signal quality measurements performed by mobile terminal 30 and provided to base stations 24, 24'.

Figure 6:
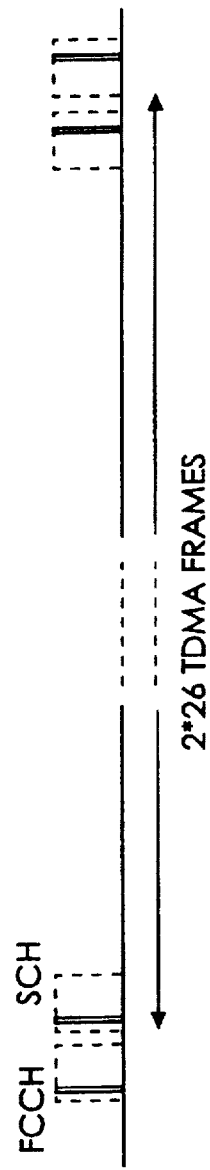
FIG. 6 graphically illustrates a radio beacon transmission channel for a private radio communications network according to the present invention.

Referring now to FIG. 6, the framing for an embodiment of a private radio communications network radio beacon according to the present invention is illustrated. The beacon transmission may contain a paging message. The private radio communications system beacon preferably includes an identification of the base station of the private radio communications network 14 and may also include status information. In the embodiment illustrated in FIG. 6, the beacon transmission is provided as a beacon channel in a TDMA frame structure having 26-frame multiframes. As with the wide area cellular network paging channel, the beacon channel may occur periodically, such as once every N×26 frame multiframes where N is an integer greater than 1. In the illustration of FIG. 6, the radio beacon timing is illustrated for N=2.

The beacon transmission from private radio communications network 14 may be implemented as a simplified version of the mobile terminal access protocol of a wide area cellular network protocol such as GSM. For example, the beacon transmission from private radio communications network 14 may include an FCCH for frequency synchronization as with GSM followed by a modified synchronization channel (SCH) transmission. Both the private radio communications network FCCH and SCH may be transmitted on a periodic basis such as the 2×26 frame TDMA multiframes illustrated in FIG. 6. The SCH slot placement relative to the FCCH may be varied from that used in the GSM wide area cellular network so that the beacon transmission of private radio communications network 14 will not be mistaken for an FCCH and SCH pair from the wide area cellular network.

Unlike in the GSM protocol, the SCH frame may include both identification and status information rather than simply providing time synchronization. This provides desirable simplicity because unlike the wide area cellular network, private radio communications network 14, as illustrated in FIG. 6, may utilize a single transmission multiframe for traffic and control which results in more limited slots for control channels to allow slots for traffic channels. For example, the SCH may include a beacon with a unique base identification to provide a unique identifier to a specific base station 24, 24' of private radio communications network 14. This identification may consist of a network color code (NCC) and a base station color code (BCC). Each private base station 24, 24' has a unique base station color code (BCC) within private radio communications network 14. However, each base station 24, 24' within the same private radio communications network 14 carries the same network color code (NCC). With a k-bit BCC, $2^k$ unique private base stations 24, 24' within private radio communications network 14 may be distinguished. The beacon transmissions from each of private base stations 24, 24' may be located on the same or different carrier frequencies.

As it is typically desirable in utilizing private radio communications network 14 to extend the battery life of mobile terminal 30 as well as to reduce the amount of potentially interfering transmissions from private base stations 24, 24', it is desirable for the beacon activity of private radio communications network 14 to be minimized. This may be accomplished by having a large N defining the beacon transmission timing in private radio communications network 14. However, N in private radio communications network 14 cannot be too long because this will increase the access time to private radio communications network 14 and increase the time required to provide handover according to the present invention. An N in the order of 2 is suitable for use with the present invention although other values of N may also be successfully utilized and obtain the benefits of the present invention.

Figure 7:
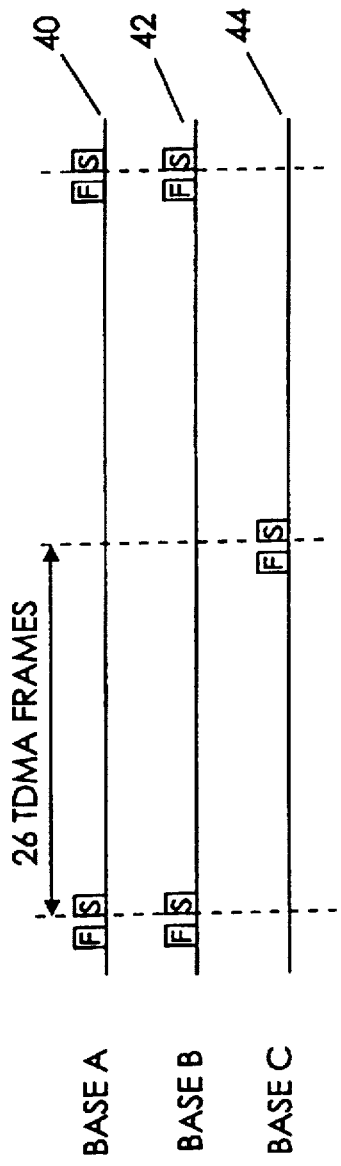
FIG. 7 graphically illustrates base station synchronization in a private radio communications network according to the present invention.

In order to facilitate handover according to the present invention, private base stations 24, 24' of private radio communications network 14 may all be synchronized up to the 26 TDMA frame multiframe level. Referring now to FIG. 7, base station synchronization according to the present invention is graphically illustrated for an embodiment of the present invention using a TDMA protocol having a 26-frame multiframe and beacon transmission from each base station every two TDMA multiframes. As illustrated in FIG. 7, private base station A (24') and private base station B (24) broadcast their beacon channel, including an FCCH indicated at F and an SCH indicated as S during the idle frame of synchronized multiframes. The beacon channel transmission from private base station C occurs on the alternating TDMA multiframes. All three base stations are synchronized to provide for beacon channel transmissions to occur during the idle frames of the illustrated 26-frame TDMA multiframe structure which is similar to that provided for a standard GSM 26 TDMA frame multiframe traffic channel. The synchronization to mobile terminal 30 is such that in traffic mode the idle frames of mobile terminal 30 coincide with the idle frames of the private base stations 24, 24' which are used for beacon channel transmission.

Figure 8:
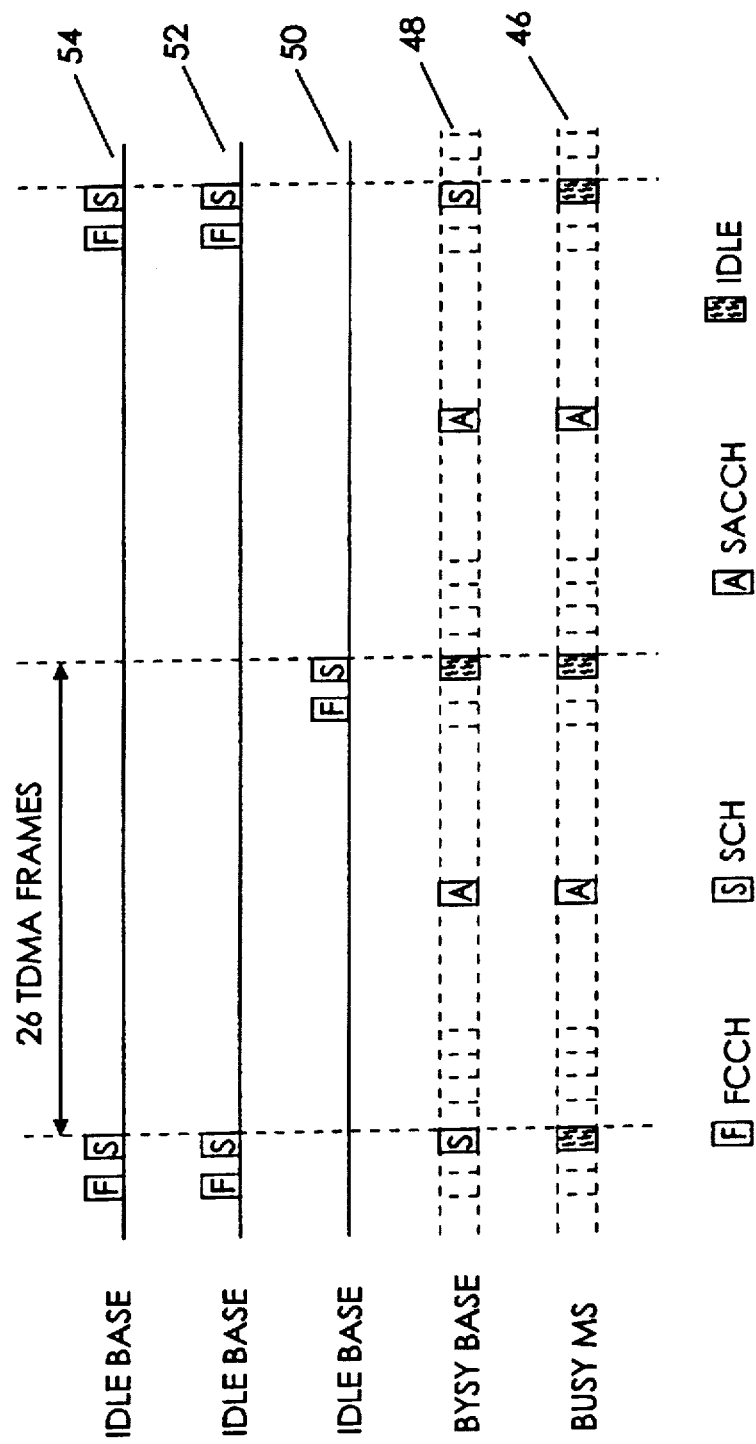
FIG. 8 graphically illustrates mobile terminal scanning to detect signal quality from base stations of a private radio communication network according to the present invention.

Referring now to FIG. 8, mobile terminal 30 receipt of beacons from nearby private base stations 24, 24' during idle frames is illustrated. Mobile terminal 30 activity is illustrated at graph 46. As illustrated in FIG. 8, mobile terminal 30 is accessing one of four private radio base 24, 24' (busy base) as illustrated at graph 48. Three other private radio base stations 24, 24' are illustrated at graphs 50, 52, and 54, respectively. Variable traffic channel transmissions between mobile terminal 30 and the busy base station are illustrated figuratively by dotted lines in graphs 46 and 48. FCCH transmissions and SCH transmissions by all four bases are illustrated by the notations F and S, respectively. The single slot for the dedicated slow access control channel (SACCH) is indicated at A and is only active between mobile terminal 30 and the busy base station as illustrated in graphs 46 and 48, respectively.

As illustrated in FIG. 8, the idle frames for mobile terminal 30 are shown in graph 46 as shaded frames at the end of each 26-TDMA frame multiframe. As will be understood from FIG. 8, the SCH burst from each base station occurs in one of the 8 slots of the idle frames of the busy traffic channel communication illustrated at 46 and 48 providing mobile terminal 30 an opportunity to monitor the strength and obtain the included identity information from the SCH transmissions of the various base stations.

While not illustrated in FIG. 8, it is to be understood that only frames are illustrated in FIG. 8 and that each frame includes eight time slots or burst periods over which the beacon transmissions of the various base stations may vary to prevent interference from collisions when base station beacon transmissions are at a common or interfering frequency. When the time varying of the beacon transmissions of the various private base stations is such that all eight slots within the idle frame are equally likely to be occupied by a beacon SCH, mobile terminal 30 may scan for a beacon transmission in one or more places during the idle frame (the exact number depends on how many consecutive beacons mobile terminal 30 can process during a single idle frame). Since the beacon channels as illustrated in FIG. 8 arrive with a two multiframe interval and mobile terminal 30 is assumed only slowly moving (indoor environment of private radio communications network 14), there are numerous opportunities for mobile terminal 30 to collect measurement data on the various private base stations 24, 24'.

Figure 9:
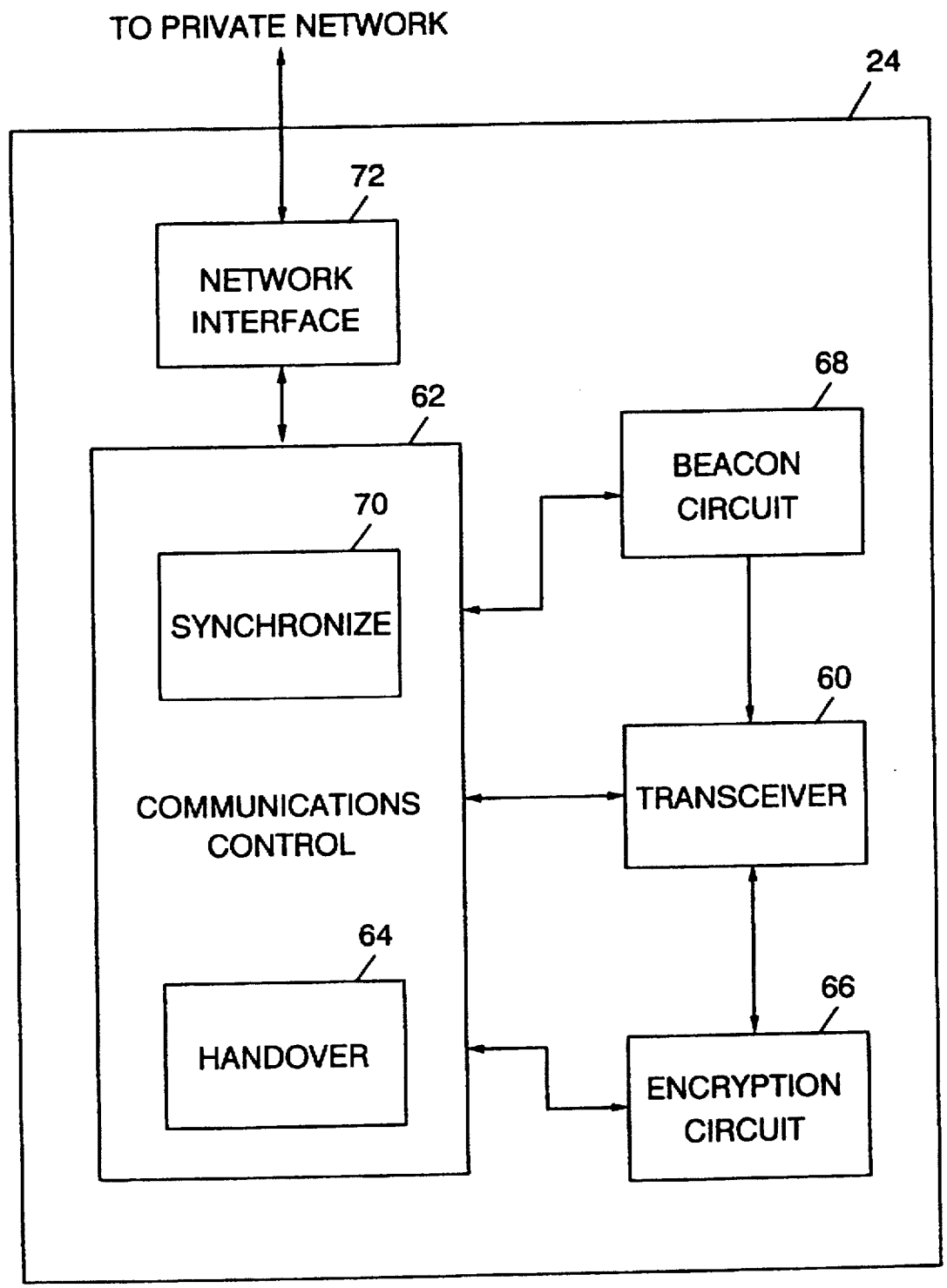
FIG. 9 is a schematic block diagram of a private base station of a private radio communications network according to the present invention.

Referring now to FIG. 9, an embodiment of a private base station 24 according to the present invention is illustrated. Private base station 24 includes transceiver 60 or other transceiver means for transmitting and receiving an encrypted traffic signal on a traffic channel of private radio communications network 14 with mobile terminal 30. Transceiver 60 is operatively connected to and responsive to communications control circuit 62 or other means for controlling radio communications according to the TDMA protocol of private radio communications network 14, including means for defining a traffic channel and a beacon channel corresponding to an idle frame of the traffic channel. Communications control circuit 62 further includes handover circuit 64 or other means for handing over a traffic connection to or from another base station 24' of private radio communications network 14.

Private base station 24 further includes encryption circuit 66 or other means for encrypting traffic connections using an encryption algorithm using a reference TDMA frame number. Encryption circuit 66 is operatively connected to communications control circuit 62 and transceiver 60 for receiving and transmitting encrypted traffic.

In addition to providing for encrypted traffic communications with mobile terminal 30 of an ongoing call, private base station 24 further provides means for a mobile terminal to locate and access private base station 24. Accordingly, private base station 24 includes beacon circuit 68 or other means for transmitting radio beacon transmissions free of a TDMA frame number on a beacon channel. Beacon circuit 68 is operatively connected to and responsive to communications control circuit 62 which allocates the beacon channel to beacon circuit 68 and may also provide additional information for inclusion in the beacon transmission such as base station identification and/or status information.

As illustrated in FIG. 9, private base station 24 further includes synchronize circuit 70 or other means for synchronizing the defined traffic channel and beacon channel of private base station 24 with the traffic channel and beacon channel of another private base station 24' on private radio communications network 14. Synchronize circuit 70 provides for frame timing synchronization for receipt of a handed over call being passed to private base station 24 from another private base station 24' of private radio communications network 14. Likewise, handover circuit 64 provides private base station 24 with means for receiving a handed over encrypted traffic connection from another private base station 24' of private radio communications network 14.

As will be described further with respect to FIG. 10, mobile terminal 30 according to the present invention is able to detect a signal quality from various private base stations 24, 24' and provide the detected signal quality information to private base station 24. The detected signal quality will be received by transceiver 60 and provided to handover circuit 64. Handover circuit 64 includes means for initiating handover of an encrypted traffic connection responsive to the transmitted detected signal quality received from mobile terminal 30 when the received detected signal quality satisfies a predetermined switching criteria. It is to be understood that the circuitry for assessing quality measurements and making a determination on handover includes means in PBX 22 to assess different signals and select between alternative base stations and handover circuit 64 is operatively connected to and responsive to signals from PBX 22 initiating and executing handover based on base station controller function capabilities of PBX 22. The actual measurements from mobile terminal 30 may be passed to the base station controller circuitry of PBX 22 by base station 24.

Handover circuit 64 also includes means for exchanging a current reference TDMA frame number with a second private base station 24' through network interface 72. Network interface 72 of private radio communications network 14 is typically a wire line connection to PBX 22 as illustrated in FIG. 5. It is to be understood that some or all of the connection may be by optical or even radio transmission. However, the link between private base stations 24, 24' of private radio communications network 14 is distinct from the radio communications protocol and frequencies used for communications with mobile terminal 30.

Private base station 24 provides radio communications with mobile terminal 30 according to a defined TDMA protocol of private radio communications network 14. According to the protocol, private base station 24 has an associated current TDMA frame number. Where a plurality of connections are underway at private base station 24 there may be a plurality of associated current TDMA frame numbers but only one associated with the call to be handed over. The frame number for base station 24 may operate similarly to a TDMA frame number under the GSM wide area cellular network protocol. The frame number could count by multiframe or hyperframe, depending upon the protocol selected but, in any event, the current TDMA frame number provides a timing reference point for communications between private base station 24 and mobile terminal 30. The current TDMA frame number of private base station 24 may also be used in the encryption algorithm for an encrypted traffic connection between private base station 24 and mobile terminal 30, for example, according to algorithms known for encryption under the GSM protocol of a wide area cellular network where the encryption algorithm includes as an input reference to a current TDMA frame number for the transmitting base station cell of the wide area cellular network.

For one embodiment of the methods of the present invention as will be described later, the handover of the encrypted traffic connection is carried out using the calls associated TDMA frame number of the first or forwarding private base station 24. Accordingly, handover circuit 64 includes means for transferring the current TDMA frame number of first base station 24 to the receiving second private base station 24' through network interface 72. The current TDMA frame number for the forwarding base station 24 may then be used for completing handover of the encrypted traffic connection from the forwarding base station 24 to the receiving base station 24'.

Private base station 24 further includes means for completing the transfer of the current TDMA frame number to the receiving base station 24' over network interface 72 within the time period of a single multiframe of the TDMA protocol of private radio communications network 14 and, preferably, completing the handover during the next following multiframe. Private base station 24 further includes means for correcting a received current TDMA frame number for a call being forwarded to private base station 24 for any transfer delays between the forwarding base station and the receiving base station based on advance of private radio communications network 14 into a next multiframe of the TDMA protocol of private radio communications network 14.

In another embodiment of the methods of the present invention as will be discussed later, the handover of the encrypted traffic connection is based upon the current TDMA frame number of the receiving private base station rather than the forwarding private base station. Accordingly, handover circuit 64 also includes means for completing handover of an encrypted traffic connection from a forwarding base station based on the current TDMA frame number of the forwarding base station in cooperation with the base station controller circuit of PBX 22. To support this embodiment, handover circuit 64 further includes means for transmitting the current reference TDMA frame number of the receiving base station for the handover to mobile terminal 30 on a dedicated control channel through transceiver 60 to prepare mobile terminal 30 for handover to a new private base station 24, 24' using a different TDMA frame number reference.

Handover circuit 64 further includes means for receiving the current TDMA frame number from the target or receiving base station and transmitting it to mobile terminal 30 within the period of a single multiframe of the TDMA protocol of private radio communications network 14 and means for correcting the received current reference TDMA frame number from the target or receiving private base station for any transfer delays between the private base stations or in transferring to mobile terminal 30 based on advance of private radio communications network 14 into a next multiframe of the TDMA protocol. The correcting for timing advance may be implemented by handover circuit 64 before passing the current reference TDMA frame number to mobile terminal 30. Handover may, preferably, then be completed during the next multiframe after receipt of the corrected current reference TDMA number for the receiving base station by mobile terminal 30.

As will be appreciated by those of skill in this art, the above-described aspects of the present invention in FIG. 9 may be provided by hardware, software, or a combination of the above. While the various components of private base station 24 have been illustrated in FIG. 9 as discrete elements, they may in practice be implemented by a microcontroller including input and output ports and running software code, by custom or hybrid chips, by discrete components or by a combination of the above. For example, communications control circuit 62, handover circuit 64, encryption circuit 66, beacon circuit 68, and synchronized circuit 70 could all be implemented as a single programmable device.

Figure 10:
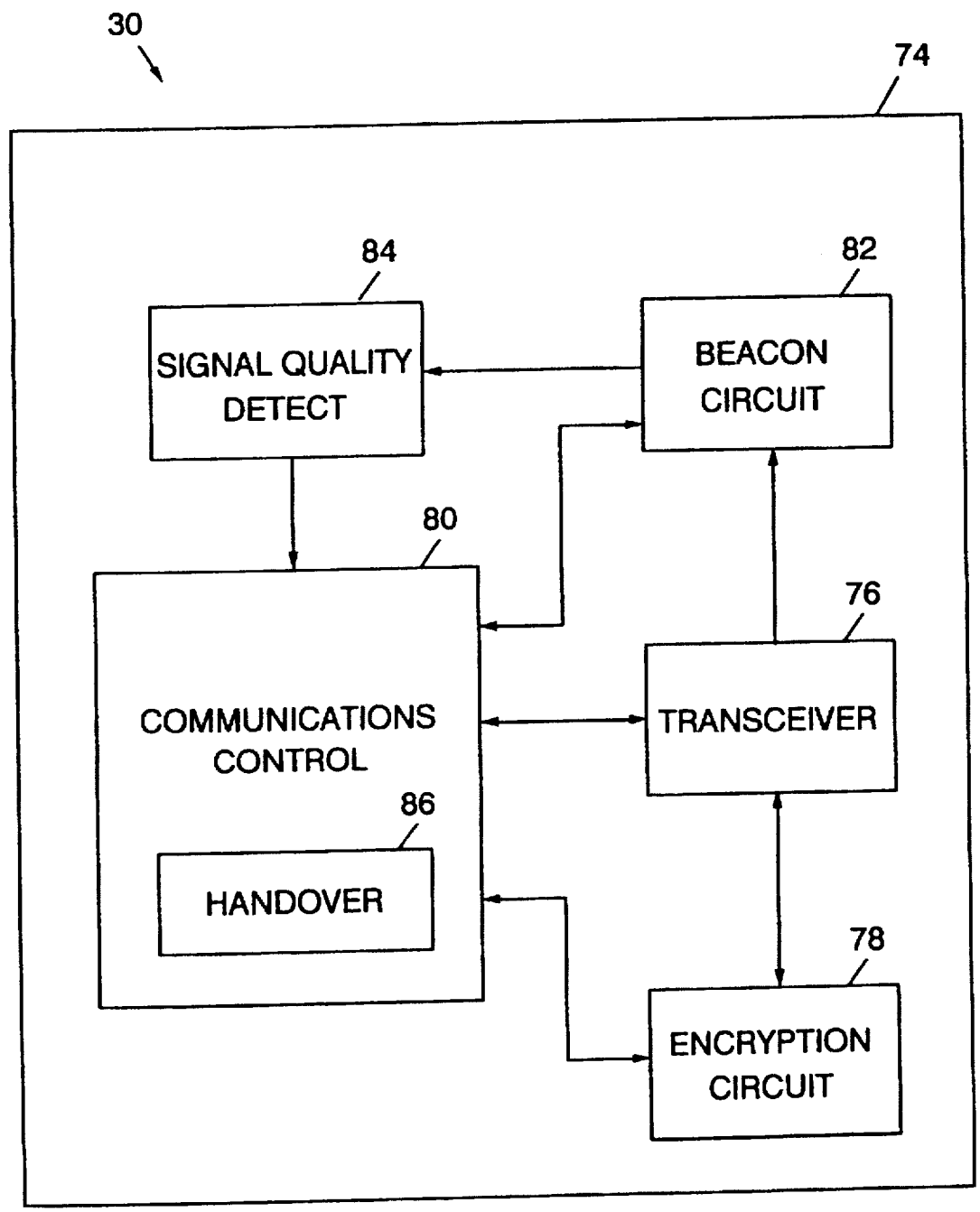
FIG. 10 is a schematic block diagram of a mobile terminal according to the present invention.

Referring now to FIG. 10, an embodiment of a mobile terminal 30 according to the present invention is illustrated. Mobile terminal 30 includes portable housing 74 or other housing means. Mobile terminal 30 includes transceiver 76 or other means for transmitting and receiving an encrypted traffic connection on a traffic channel of private base station 24, 24'. Encryption circuit 78 or other encryption means for encrypting the traffic connection using an encryption algorithm dependent on a reference TDMA frame number is also provided in portable housing 74 of mobile terminal 30. Encryption circuit 78 is operatively electrically connected to transceiver 76 and also to communications control circuit 80.

Beacon circuit 82 or other means for receiving transmitted radio beacon transmissions free of a TDMA frame number on the beacon channel of private base station 24, 24' during idle frames of an ongoing traffic connection with another private base station 24, 24' is also operatively electrically connected to transceiver 76. Beacon circuit 82 is further operatively connected to signal quality detect circuit 84 or other means for detecting a signal quality from a received radio beacon transmission from one of private base stations 24, 24'.

Communications control circuit 80 provides control means for controlling radio communications according to the TDMA protocol of private radio communications network 14 between mobile terminal 30 and private radio communications network 14. Communications control circuit 80 further includes means for transmitting a detected signal quality from mobile terminal 30 to private base station 24, 24' through transceiver 76. The detected signal quality may be provided to the private base station 24, 24' with which an ongoing encrypted traffic connection is underway using a control channel such as a slow associated control channel or a fast associated control channel. Communications control circuit 80 further includes handover circuit 86 or other means for providing mobile terminal 30 capabilities for completing handover of an encrypted traffic connection between private base stations 24, 24' of private radio communications network 14.

Signal quality detect circuit 84, in addition to detecting a signal quality of a received beacon transmission, may also decode the received radio beacon transmission to determine an associated identification of the transmitting private base station 24, 24'. Communications control circuit 80 may include the decoded associated identification number along with the detected signal quality in the transmission on a control channel to private base station 24, 24' through receiver 76. Private radio communications network 14 can then take the appropriate actions to handover mobile terminal 30 to another private base station 24, 24' if desired, thereby providing mobile assisted handover.

As will be appreciated by those of skill in this art, the above-described aspects of the present invention in FIG. 10 may be provided by hardware, software, or a combination of the above. While the various components of mobile terminal 30 have been illustrated in FIG. 10 as discrete elements, they may in practice be implemented by a microcontroller including input and output ports and running software code, by custom or hybrid chips, by discrete components or by a combination of the above. For example, communications control circuit 80, handover circuit 86, signal detect quality circuit 84, beacon circuit 82, and encryption circuit 78 could all be implemented as a single programmable device.

Figure 11:
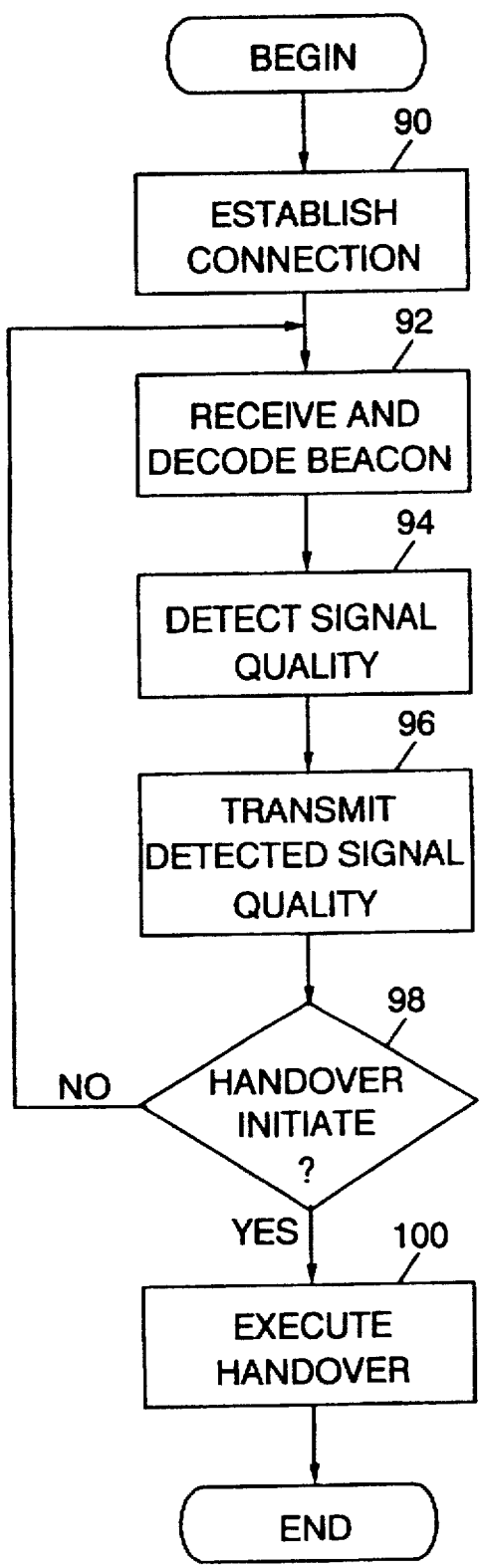
FIG. 11 is a flowchart illustrating operations of mobile assisted handover between private base stations of a private radio communications network according to the present invention.

Referring now to FIG. 11, an embodiment of the operations for mobile assisted handover of a traffic connection between private base stations 24, 24' of a TDMA protocol based private radio communications network 14 which periodically transmits a radio beacon on a beacon channel will be described. At block 90, a traffic connection is established with a first or forwarding private base station 24 of private radio communications network 14. The traffic connection may be an encrypted traffic connection based on a random encryption number which is updated from an initial assigned value based on the associated current TDMA frame number of the first private base station 24. Encryption algorithms based on a current TDMA frame number are known and provided for in the GSM protocol specifications as described in *The GSM System for Mobile Communication*, 1992, published by M. Mouly and M. Pautet, at Section 7.2.2.2.

At block 92, mobile terminal 30 receives and decodes a radio beacon transmission from a second or receiving private base station 24' of private radio communications network 14 during an idle frame of the traffic connection established at block 90 with the first or forwarding base station 24. At block 94, mobile terminal 30 detects a signal quality from the received radio beacon transmission. At block 96, mobile terminal 30 transmits the detected signal quality from the received radio beacon transmission to private radio communications network 14 on a control channel of the traffic connection with the first or forwarding base station 24.

Decode operations at block 92 may include decoding the base identification for the receiving or second base station 24'. The base station identification may be provided along with the detected signal quality to the private radio communications network 14 at block 96. The associated identification of a base station 24, 24' may include a base station color code and a network color code.

At block 98, if private radio communications network 14 determines that the detected signal quality from the received radio beacon transmission provided by mobile terminal 30 satisfies a predetermined switching criteria it initiates handover of the traffic connection between base stations at block 98. Detected signal qualities from a plurality of alternative base stations may be received and considered in making a decision on handover. Each of these signals may be compared to the detected signal quality of the current connection in determining whether handover should be initiated. At block 100, private radio communications network 14 executes handover of the traffic connection from the first or forwarding base station 24 to the second or receiving base station 24'.

It is to be understood that as with a wide area cellular network protocol such as GSM, both the forwarding and receiving base stations and mobile terminal 30 participate in the operations necessary to complete handover of an ongoing traffic connection between base stations. The decision to initiate handover may be based on a variety of criteria comparing the quality of the ongoing traffic connection between mobile terminal 30 and the first base station 24 and the signal quality from transmissions from other private base station 24'. In any event, the predetermined switching criteria is determined based on an expectation that the quality of the traffic connection will be improved by transferring the connection to a different private base station 24'.

Figure 12:
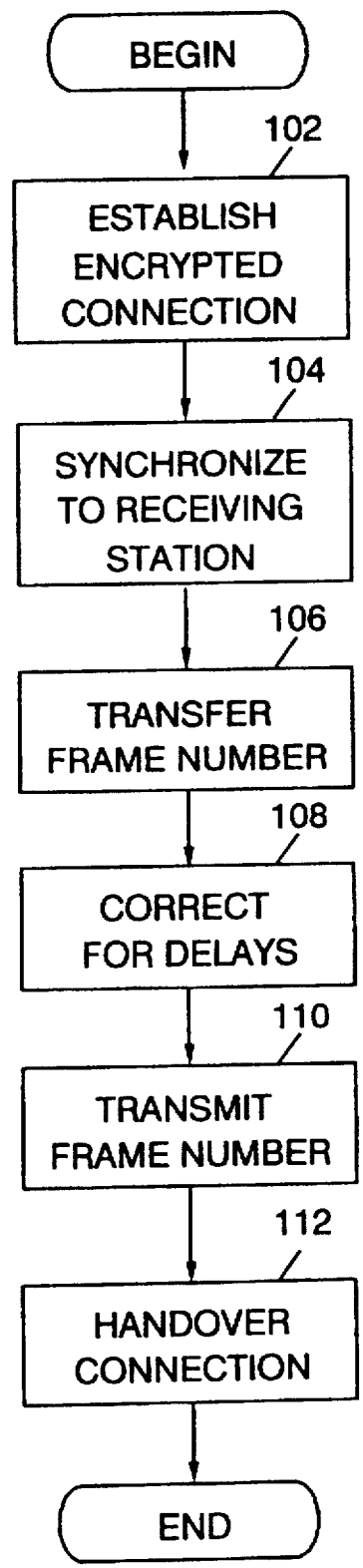
FIG. 12 is a flowchart illustrating operations for handover of an encrypted traffic connection between private base station of a private radio communications network according to the present invention.

Referring now to FIG. 12, the various operations for executing handover at block 100 of an encrypted traffic connection according to an embodiment of the present invention will be described more fully. As indicated at block 102, the established traffic connection from block 90 is established as an encrypted traffic connection between a first or forwarding base station 24 of private radio communications network 14 and mobile terminal 30 based on a random encryption number which is updated from an initial assigned value based on the associated current TDMA frame number of the first or forwarding base station 24. For purposes of the description in the embodiment of FIG. 12, operations will first be described for a call being forwarded from first or forwarding base station 24 to second or receiving base station 24' using a handover of encryption based on the current TDMA frame number from the second or receiving base station 24'.

At block 104, the multiframe transmissions of first base station 24 and second base station 24' are synchronized. Each of first base station 24 and second base station 24' have a current TDMA frame number. At block 106, the current TDMA frame number of second base station 24' is transferred to first base station 24 on the link between first base station 24 and second base station 24' of private radio communications network 14 as illustrated through PBX 22 in FIG. 5. At block 108, first base station 24 corrects for any transfer delays in the transmission of the current TDMA frame number of second base station 24' to first base station 24 based on advance of private radio communications network 14 into the next consecutive multiframe.

At block 110, first base station 24 transmits the corrected current TDMA frame number of second base station 24' to mobile terminal 30 on a dedicated control channel of the ongoing traffic connection between mobile terminal 30 and first base station 24. The correction may alternatively be performed in whole or in part by mobile terminal 30. At block 112, handover of the encrypted traffic connection from first base station 24 to second base station 24' is completed using the corrected current TDMA frame number of second base station 24'.

In an alternative embodiment of the operations of the present invention, handover of the encrypted traffic connection is accomplished based upon the current TDMA frame number of the first base station 24 which is already in use by mobile terminal 30 for the ongoing encrypted traffic connection. Accordingly, at block 106, first base station 24 transfers its current TDMA frame number to second base station 24'. At block 108, second base station 24' corrects for any delays due to system advance in the transfer of the current TDMA frame number from first base station 24. In this embodiment, the operations at block 110 are not required as the handed over encrypted traffic connection will continue using the TDMA frame reference from first base station 24 which mobile terminal 30 is already using for its encryption. Finally, at block 112, handover of the encrypted traffic connection from first base station 24 to second base station 24' is completed using the corrected current TDMA frame number of first base station 24.

Referring now to FIG. 13, handover operations according to the present invention based on the embodiment using the current TDMA frame number of the first base station will be further described. In order to obtain a smooth handover which the user of mobile terminal 30 will not notice, it is preferable that the handover take place from one TDMA frame on the first or forwarding base station 24 to the next TDMA frame on the second or receiving base station 24'. This should preferably be carried out at the border of a multiframe. Because base stations 24, 24' are frame-synchronized, private radio communications network 14 can prepare them well in advance to carry out the handover.

In addition, the encryption should continue by assuring that the second or receiving base station 24' and mobile terminal 30 use the same reference input to the encryption algorithm. Because private radio communications network 14 does not include a broadcasted TDMA frame number, the methods as used currently in GSM wide area cellular network protocol may not be utilized. As described above in a wide area cellular network, handover of encrypted traffic connections under GSM may be provided as the new frame number for the receiving base station 16, 16', 16" may be derived from the broadcast synchronization channel SCH transmitted by the new base station 16, 16', 16" and received by mobile terminal 30. For the reasons discussed above, a broadcasted TDMA frame number is not provided in the private radio communications network 14 due to the different constraints on control transmissions for private radio communications network 14.

The encryption in private radio communications network 14 may rely on the updating of a random number which is provided initially by private radio communications network 14 to the private base station 24, 24' establishing the encrypted traffic connection and in turn provided to the mobile terminal 30 during call setup. The initial random encryption number is updated periodically with each new TDMA frame and the updating is maintained in both private base station 24, 24' and mobile terminal 30. It is to be understood that the random number may be derived from the TDMA frame number or may be a derivative of the TDMA frame number and some form of cipher key shared between mobile terminal 30 and private base station 24, 24'. Accordingly, because the cipher key used is shared by the base stations 24, 24' and mobile terminal 30, the TDMA frame number information which is exchanged between base stations 24, 24' as described above in connection with FIG. 12 may be encoded for transfer in the form of the random encryption number or, alternatively, be transferred without application of the cipher. For purposes of simplicity in the discussion which follows, reference may be made to the random number rather than to TDMA frame number. However, it is to be understood that the operations described with respect to the TDMA frame number as described herein are intended to encompass practicing of the present invention regardless of whether the frame number is transferred in a ciphered random number form or otherwise and the terms are used interchangeably herein.

As illustrated in FIG. 13, frame contents and timing for mobile terminal 30 during handover are illustrated schematically at graph 114. Frame contents and timing for first or forwarding base station (old base B) 24 are shown at graph 116. Frame contents and timing for second or receiving base station (new base A) 24' are illustrated at graph 118.

When a handover has been determined to be desirable from first base station 24 to second base station 24', private radio communications network 14 waits for the arrival of an idle frame as illustrated at time 120. The current random number for first base station 24 is then transferred by private radio communications network 14 to second base station 24'. Because second base station 24' knows that the random number received corresponds to the encryption number of first base station 24 at the time of the latest idle frame, second base station 24' can correct for any uncertain delay in the transfer of the random number since the multiframe transmission of private base stations 24, 24' are synchronized and because base station 24' knows how far private radio communications network 14 has advanced into the new multiframe. In this way, for the embodiment illustrated in FIG. 13 with a 26-frame multiframe, the delay for transferring the current random number can last up to 26 TDMA frames.

The handover then, preferably, takes place after the second idle frame at time 122. Mobile terminal 30 does not need to change its random number for encryption because the same number is continued in second base station 24' for the encryption algorithm. As illustrated in FIG. 13, the dotted lines between times 120 and 122 in the graphs 114 and 116 reflect variable traffic channel transmissions between mobile terminal 30 and first base station 24. After handover at time 122, traffic channel communications are indicated schematically as dotted lines in graphs 114 and 118 reflecting that the ongoing traffic connection is between mobile terminal 30 and second base station 24'. The slow associated control channel is also illustrated by notation A, first between mobile terminal 30 and first base station 24 (at 114 and 116) and after handover between mobile terminal 30 and second base station 24' (at 114 and 118). As illustrated at time 122 in FIG. 13, because of the advance of the TDMA protocol to the next multiframe, the TDMA frame number for the handed over traffic connection will actually be the reference value as sent by the new base station 24' incremented by 26, reflecting the 26-frame multiframe structure for the illustrated embodiment of FIG. 13.

One disadvantage of the embodiment illustrated in FIG. 13 is that when the receiving private base station 24, 24' is supporting more than one encrypted traffic connection with a plurality of mobile terminals 30, base station 24, 24' may be required to use different current TDMA frame number reference values for communications with different mobile terminals 30. This problem is avoided in an alternative embodiment of the methods of the present invention in which each private base station 24, 24' uses only a single TDMA frame number for all traffic connections. This is provided as described previously by transferring the current frame number of the receiving base station to mobile terminal 30 through the forwarding base station. Operations in the second embodiment of the present invention will be further described as illustrated graphically in FIG. 14. Frame contents and timing for mobile terminal 30 is illustrated at 124, for first or forwarding base station (old base B) 24 at 126 and for second or receiving base station (new base A) 24' at 128. In order for mobile terminal 30 to be handed over to a second or receiving base station 24' as illustrated in FIG. 14, it must know the frame number to be used for encryption of the encrypted traffic connection to the new base station 24'. Accordingly, when handover is initiated during an idle frame as indicated at time 130, second base station 24' transfers its current TDMA frame number (typically corresponding to the start of the multiframe) to the first or forwarding base station 24 (i.e., the opposite of the previous embodiment). First or forwarding base station 24 then transmits the current TDMA frame number of second or receiving base station 24' to mobile terminal 30 as illustrated at time 131. The frame number for use by mobile terminal 30 after handover may be corrected for any transfer delays encountered. The corrected current frame number (or random number) from the receiving or second base station 24' may then be used after handover to second or receiving base station 24'. Handover preferably takes place following the next idle frame as illustrated at time 132. As illustrated in FIG. 14 at time 131, the transfer to mobile terminal 30 of the current frame number from second or receiving base station 24' takes place on a fast access channel (FACCH) rather than on a slow access channel (SACCH).

In both embodiments as illustrated in FIGS. 13 and 14, the transfer of the TDMA reference frame number takes place within the period of a single multiframe of the TDMA protocol of private radio communications network 14. The handover step is then, preferably, completed after the next idle frame following receipt of the corrected current TDMA frame number providing for completion of handover from one TDMA frame of the first or forwarding base station 24 to the next TDMA frame number of the second or receiving base station 24'.

While it is preferable for seamless handover to complete handover from one multiframe to the next multiframe, the benefits of the present invention may be obtained where intervening multiframes occur. Private radio communications network 14 may, in any event, keep track of any intervening multiframes to provide for proper correction of the TDMA frame reference number for use after handover based upon any delays encountered.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A private radio communications network with mobile assisted handover between linked base stations of the private radio communications network having a TDMA protocol of an encrypted traffic connection between the private radio communications network and a mobile terminal, comprising:

a first base station including:
communications control means for controlling radio communications according to said TDMA protocol including means for defining a traffic channel and a beacon channel corresponding to an idle frame of said traffic channel, said communications control means including means for handing over said encrypted traffic connection;

encryption means for encrypting said traffic connection using an encryption algorithm having an output dependent on a reference TDMA frame number;

transceiver means for transmitting and receiving said encrypted traffic connection on said traffic channel; and, means for transmitting radio beacon transmissions free of a TDMA frame number on said beacon channel;

a second base station of said private radio communications network linked to said first base station including:

communications control means for controlling radio communications according to said TDMA protocol including means for defining a traffic channel and a beacon channel corresponding to an idle frame of said traffic channel and further including means for synchronizing said traffic channel and said beacon channel of said second base station with said traffic channel and said beacon channel of said first base station, said communications control means of said second base station including means for receiving said handed over encrypted traffic connection from said first base station;

encryption means for encrypting said traffic connection using said encryption algorithm having an output dependent on a reference TDMA frame number;

transceiver means transmitting and receiving said encrypted traffic connection on said traffic channel; and, means for transmitting radio beacon transmissions free of a TDMA frame number on said beacon channel; and, a mobile terminal including:
transceiver means for transmitting and receiving said encrypted traffic connection on said traffic channel of said first base station;

encryption means for encrypting said traffic connection using said encryption algorithm having an output dependent on a reference TDMA frame number;

means for receiving said transmitted radio beacon transmissions free of a TDMA frame number on said beacon channel of said second base station during an idle frame of said traffic connection with said first base station; and, wherein said means for initiating handover includes means for exchanging a current reference TDMA frame number with said second base station.

2. The private radio communications network of claim 1 wherein said mobile terminal further includes:

means for detecting a signal quality from a received radio beacon transmission from said second base station;

means for detecting a signal quality of said traffic connection from said first base station; and, means for transmitting at least one of said detected signal quality from a received radio beacon transmission or said detected signal quality of said traffic connection to said first base station; and wherein said communications control means of said first base station further includes means for initiating handover of said encrypted traffic connection when said received detected signal quality satisfies a predetermined switching criteria.

3. The private radio communications network of claim 2 wherein said means for detecting a signal quality from a received radio beacon transmission from said second base station further includes means for decoding a received radio beacon transmission to determine an associated identification of said second base station and wherein said means for transmitting a detected signal quality to said first base station further includes means for transmitting a decoded associated identification of the second base station to said first base station.

4. The private radio communications network of claim 2 wherein said first base station has an associated current TDMA frame number for said encrypted traffic connection, and wherein said current reference TDMA frame number is said current TDMA frame number of said first base station and wherein said means for receiving said handed over encrypted traffic connection includes means for completing handover of said encrypted traffic connection from said first base station to said second base station based on said current reference TDMA frame number.

5. The private radio communications network of claim 4 wherein said TDMA protocol includes a defined multiframe and wherein said means for exchanging a current reference TDMA frame number further includes means for transferring said current reference TDMA frame number to said second base station on said link between said first base station and said second base station and wherein said communications control means of said second base station further includes means for correcting said received current reference TDMA frame number for any transfer delays between said first base station and said second base station based on advance of said private radio communications network into a next multiframe of said TDMA protocol.

6. The private radio communications network of claim 5 wherein said means for transferring said current reference TDMA frame number to said second base station on said link between said first base station and said second base station includes means for transferring said current reference TDMA frame number within the time period of a single multiframe of said TDMA protocol and wherein said handover is completed during said next multiframe.

7. The private radio communications network of claim 2 wherein said second base station has an associated current TDMA frame number and wherein said current reference TDMA frame number is said current TDMA frame number of said second base station and wherein said means for receiving said handed over encrypted traffic connection includes means for completing handover of said encrypted traffic connection from said first base station to said second base station based on said current reference TDMA frame number, and wherein said means for handing over said encrypted connection includes means for transmitting said current reference TDMA frame number to said mobile terminal on a dedicated control channel.

8. The private radio communications network of claim 7 wherein said TDMA protocol includes a defined multiframe and wherein said means for exchanging a current reference TDMA frame number further includes means for transferring said current reference TDMA frame number to said first base station on said link between said first base station and said second base station.

9. The private radio communications network of claim 8 wherein said communications control means of said first base station further includes means for correcting said received current reference TDMA frame number for any transfer delays between said first base station and said second base station based on advance of said private radio communications network into a next multiframe of said TDMA protocol prior to transmitting said current reference TDMA frame to said mobile terminal.

10. The private radio communications network of claim 9 wherein said means for transferring said current reference TDMA frame number to said first base station on said link between said first base station and said second base station and said means for transmitting said current reference TDMA frame number to said mobile terminal on a dedicated control channel include means for transferring said current reference TDMA frame number to said mobile terminal within the time period of a single multiframe of said TDMA protocol and wherein said handover is completed during said next multiframe.

11. A method for maintaining encryption during handover of an encrypted traffic connection between linked base stations of a TDMA protocol based private radio communications network which periodically transmits a radio beacon free of a reference TDMA frame number on a beacon channel comprising the steps of:

establishing the encrypted traffic connection with a first base station of the private radio communications network based on a random encryption number which is updated from an initial assigned value based on the current TDMA frame number of the first base station;

synchronizing to a second base station to which the traffic connection is to be handed over;

transferring the current TDMA frame number of the first base station to the second base station on the link between the first base station and the second base station of the private radio communications network;

correcting for any transfer delays between the first base station and the second base station based on advance of the private radio communications network into the next consecutive multiframe;

completing handover of the encrypted traffic connection from the first base station to the second base station using the corrected current TDMA frame number of the first base station.

12. The method of claim 11 wherein said transferring step occurs within the time period of a single multiframe of the TDMA protocol of the private radio communications networks.

13. The method of claim 12 wherein said completing handover step is executed at the beginning of a next multiframe following receipt of the corrected current TDMA frame number of the first base station.

14. The method of claim 12 wherein said completing handover step is executed from one TDMA frame of the first base station to the next TDMA frame of the second base station.

15. A method for maintaining encryption during handover of an encrypted traffic connection between linked base stations of a TDMA protocol based private radio communications network which periodically transmits a radio beacon on a beacon channel comprising the steps of:

establishing the encrypted traffic connection with a first base station of the private radio communications network based on a random encryption number which is updated from an initial assigned value based on the current TDMA frame number of the first base station;

synchronizing to a second base station having a current TDMA frame number to which the traffic connection is to be handed over;

transferring the current TDMA frame number of the second base station to the first base station on the link between the first base station and the second base station of the private radio communications network;

correcting for any transfer delays between the first base station and the second base station based on advance of the private radio communications network into the next consecutive multiframe;

transmitting the corrected current TDMA frame number of the second base station to the mobile terminal on a dedicated control channel of the first base station; and, completing handover of the encrypted traffic connection from the first base station to the second base station using the corrected current TDMA frame number of the second base station.

16. The method of claim 15 wherein said transferring step and said transmitting step both occur within the time period of a single multiframe of the TDMA protocol of the private radio communications networks.

17. The method of claim 16 wherein said completing handover step is executed after the next idle frame following receipt of the corrected current TDMA frame number of the first base station.

18. The method of claim 16 wherein said completing handover step is executed from one TDMA frame of the first base station to the next TDMA frame of the second base station.

* * * * *